United States Patent [19]

Wildgen

[11] Patent Number: 4,850,310

[45] Date of Patent: Jul. 25, 1989

[54] BOILER CONTROL HAVING REDUCED NUMBER OF BOILER SEQUENCES FOR A GIVEN LOAD

[76] Inventor: Harry Wildgen, 875 Aspen, Springfield, Oreg. 97477

[21] Appl. No.: 183,529

[22] Filed: Apr. 14, 1988

Related U.S. Application Data

[63] Continuation of Ser. No. 880,365, Jun. 30, 1986, abandoned.

[51] Int. Cl.[4] .......................... F22B 35/00; F23N 5/20
[52] U.S. Cl. ................................. 122/446; 237/8 R; 236/46 F; 236/46 R
[58] Field of Search ................. 122/446, 447, 448 R; 237/8 R; 236/46 R, 46 A, 46 E, 46 F, 47

[56] References Cited

U.S. PATENT DOCUMENTS

| | | | |
|---|---|---|---|
| 2,477,728 | 8/1949 | Fitzgerald | 236/46 F |
| 3,979,059 | 9/1976 | Davis et al. | 236/46 R |
| 4,292,813 | 10/1981 | Paddock | 236/46 F |
| 4,502,625 | 3/1985 | Mueller | 236/46 E |
| 4,634,046 | 1/1987 | Tanaka | 236/46 F |
| 4,637,349 | 1/1987 | Robinson | 237/8 R |

FOREIGN PATENT DOCUMENTS 2151815 7/1985 United Kingdom ............. 236/46 F

Primary Examiner—Henry C. Yuen
Attorney, Agent, or Firm—Lowe, Price, Leblanc, Becker & Shur

[57] ABSTRACT

To reduce the number of boiler sequences over time executed for a given heating load without adversely affecting boiler efficiency, the call signal applied to the boiler to initiate a sequence in response to a demand for heating is delayed as a function of outside temperature and time elapsed since the end of the previous sequence. Accumulated burn time and sequence count are displayed to monitor boiler performance.

13 Claims, 3 Drawing Sheets

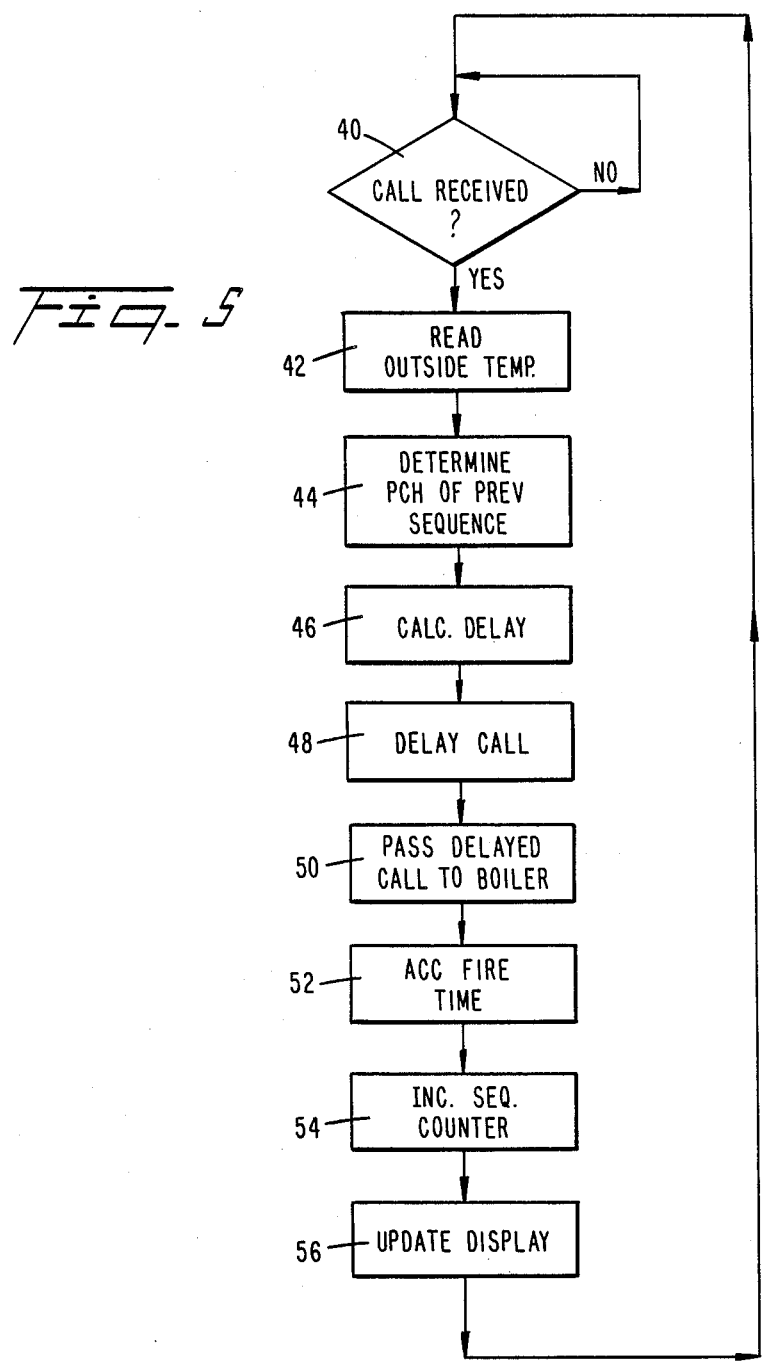

4,850,310

BOILER CONTROL HAVING REDUCED NUMBER OF BOILER SEQUENCES FOR A GIVEN LOAD

This application is a continuation of application Ser. No. 880,365 filed June 30, 1986, now abandoned.

TECHNICAL FIELD

This invention relates generally to methods and apparatus for boiler control, and more particularly, toward an improved method of and apparatus for controlling a boiler to minimize the number of boiler sequences executed for a given load.

BACKGROUND ART

In a typical early boiler for building heating, a burner to generate heat is fired in response to detected water temperature or steam pressure in the boiler itself, depending upon boiler type. The hot water or steam generated in the boiler is circulated throughout the building to heat transfer elements (radiators). There is not individual control of heat delivery into particular zones or rooms and, typically, windows are opened for cooling. More heat is produced than is necessary and a substantial amount of the heat energy that the user pays for is wasted.

A somewhat more sophisticated boiler control system includes a thermostatic control valve at each radiator to control heat transfer from the boiler through individual radiators to each zone. Substantial heat energy is lost in this type of system as well because, since the thermostatic valves are mounted directly on the radiators, each radiator must be over-heated to heat the zone reasonably rapidly and because there is no cooperation of heating control among zones.

More advanced boiler control systems operate the boiler with consideration given to the temperatures of building zones, the outside temperature and the available rate of heat transfer from the boiler. Although such systems generally are substantially more efficient than the basic controls, a significant amount of heat energy is lost each time the boiler executes a boiler sequence, for reasons described hereinafter.

Referring to FIG. 1, a typical boiler sequence consists of the following series of steps:

(1) pre-purge
(2) ignition
(3) fire
(4) shut down
(5) post-purge
(6) stop

During Pre-Purge, the boiler burner forces air (but no fuel) through the combustion chamber of the boiler to eliminate any residual fuel that might otherwise burn explosively when ignition takes place; this usually occurs for between ten and thirty seconds. Upon Ignition, the flow of air through the combustion chamber is cut to a minimum, a fuel valve is opened, and a high voltage spark ignites the fuel-air mixture; for about ten seconds. During subsequent Firing, an air inlet is opened to a maximum and the boiler fires until the operating control is satisfied, i.e., until the temperature (water boiler) or pressure (steam boiler) has reached a predetermined temperature or pressure value; the duration of this portion of the sequence is variable, depending upon the size of the heating load involved. Shut Down, which extends for about ten seconds, closes the fuel and air valves and, during Post-Purge, the blower thereafter continues to run with the air valve opened to a maximum to force residual partially burned fuel and gases from the boiler (about 30-45 seconds). Finally, the blower shuts off (Stop).

The Pre-Purge and Post-Purge steps of the boiler cycle are critical to the safe operation of the system, but heat is lost each time the boiler is purged of already heated gases, usually by colder air. It is accordingly preferred to reduce the frequency of sequences (as outlined above) executed by the boiler for a given heat load, thereby to maximize the efficiency of the system. As a further benefit, sequence reduction substantially reduces the amount of maintenance required on the boiler.

Accordingly, it is an object of this invention to increase the efficiency of a boiler by reducing the frequency of sequences executed by the boiler for a given heat load.

Another object is to provide a method of and system for improving the efficiency of a boiler without adversely affecting space comfort.

A further object of the invention is to provide a method of and system for improving the efficiency of a boiler by utilizing the inherent overcapacity of a boiler with respect to a given load.

DISCLOSURE OF THE INVENTION

In accordance with the invention to reduce the number of boiler sequences executed for a given heat load, initiation of each boiler sequence is delayed as a function of the ambient temperature and the amount of time that has elapsed since the end of the previous sequence. Ambient temperature is measured by a temperature sensor, and the elapsed time is measured by a timer. The two measurements are combined in an algorithm and the result applied to determine the amount of time by which a call signal, applied to the boiler to initiate a boiler sequence in response to a demand for heat, is delayed.

The amount of time that ignition takes place as well as the number of boiler sequences executed during a predetermined time interval is accumulated and displayed.

Other features of the invention will be apparent from the following description and from the drawings. While an illustrative embodiment of the invention is shown in the drawings and will be described in detail herein, the invention is susceptible of embodiment in many forms and it should be understood that the present disclosure is to be considered as an example of the principles of the invention and is not intended to limit the invention to the embodiment illustrated.

BRIEF DESCRIPTION OF THE DRAWINGS

FIG. 5 is a flow chart of programming for operating the control; and

BEST MODE FOR PRACTICING THE INVENTION

Figure 1:
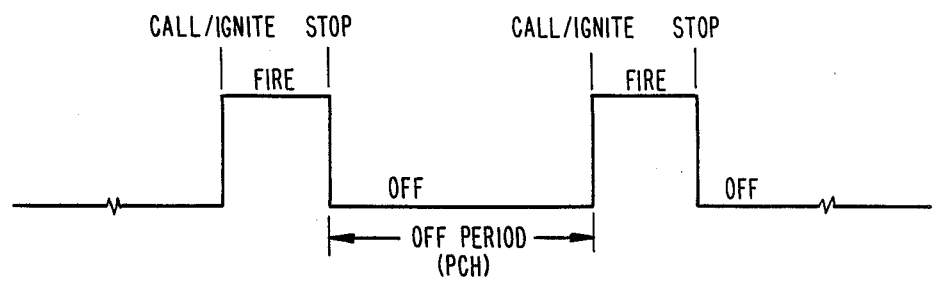
FIG. 1 is a diagram of a conventional boiler sequence.
Figure 2:
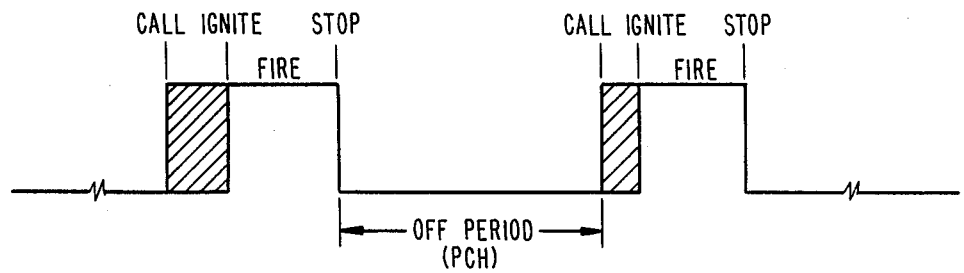
FIG. 2 is a diagram of a boiler sequence improved in accordance with the invention.

A boiler sequence developed in accordance with the invention to reduce the number of sequences executed by the boiler for a given heat load is characterized by a delay period, shown in FIG. 2 as a cross hatch region, between receipt of a call signal to the boiler and execution of a boiler sequence. Thus, the Ignition step of each sequence is delayed following a call for heating by a period determined in accordance with the principles of this invention to be described below. Although, as will be explained, the duration of the Fire Interval as a result of the delayed Ignition will become extended, fewer sequences are executed by the boiler for a given heating load in a given period, thereby increasing substantially the efficiency of the boiler and reducing considerably the amount of boiler maintenance required over time. The duration of the call delay is determined as a function of at least one heating parameter. In accordance with a preferred embodiment of the invention, the delay is determined as a function of two variables, the outside (ambient) temperature and the amount of time that has passed since the end of the previous boiler cycle (termed hereinafter "percentage of holdoff", or PCH). The PCH is measured by means of a timer.

Figure 3:
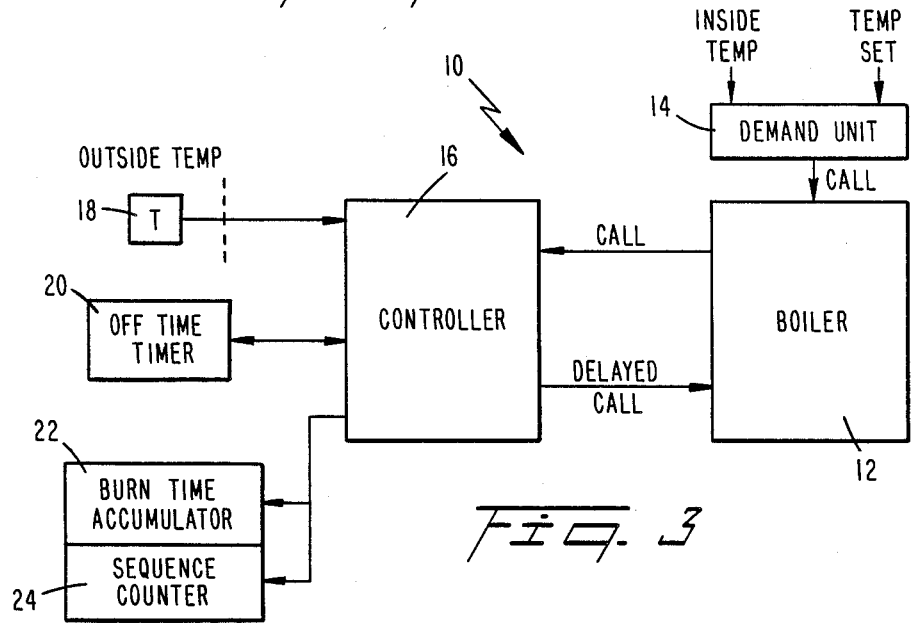
FIG. 3 is a simplified block diagram of a boiler system provided in accordance with the principles of the invention.

With the reference to FIG. 3, a boiler system 10 in accordance with the invention comprises a standard boiler 12 that receives a call signal from a standard boiler control unit or "Demand Unit" 14 that compares inside and preselected temperatures to determine when there is a demand for more heat. The call signal applied to the boiler would in the prior art initiate ignition of a boiler sequence. In accordance with the present invention, however, the call signal is applied to controller 16 which determines a delay time depending upon the outside temperature measured by a temperature sensor 18 and the time elapsed since the end of the previous sequence, measured by a timer 20 or alternatively calculated in a manner to be described below. Optionally, the duration of each burn interval may be accumulated by accumulator 22, and a count of the sequences may be accumulated by sequence controller 24 for subsequent display.

The delayed call signal is returned to the boiler to initiate a boiler sequence which will operate for a duration of time that depends upon the heating load involved, i.e., the thermal mass of the zone to be heated and the temperature demand differential. Although the duration of each sequence is lengthened as a result of the delay, fewer sequences are carried out by the boiler for any given load.

Figure 4:
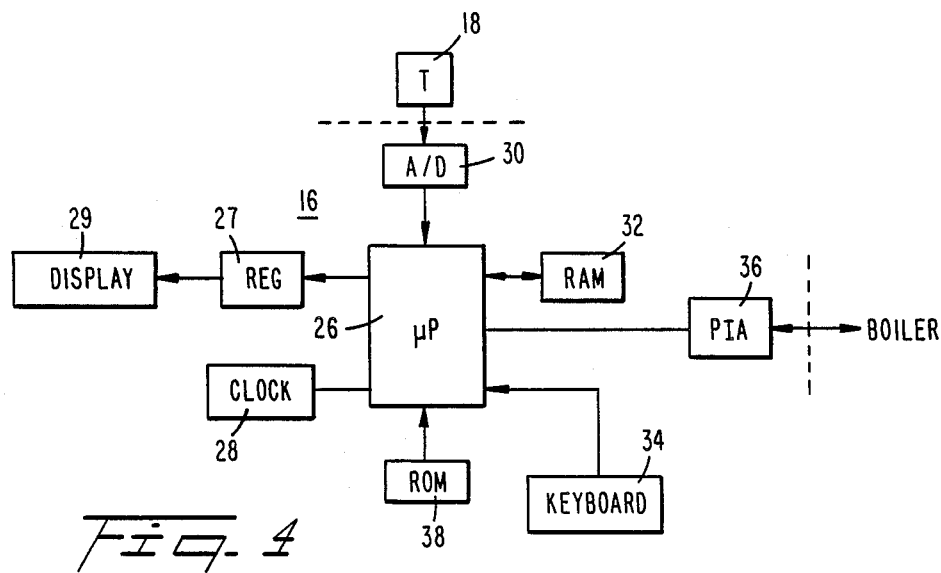
FIG. 4 is a detailed block diagram of the boiler controller shown in FIG. 3.

In the more detailed block diagram of FIG. 4, controller 126 comprises a standard microprocessor 26 that receives the output of a real time clock 28 which establishes a duration of day time base and measures the time durations of the various intervals of each boiler sequence. Selected intervals are accumulated and stored temporarily in register 27 for selective display in display unit 29. Ambient temperature measured by sensor 18 is applied to the microprocessor through analogdigital converter 30 and user inputs are applied via keyboard 34. Interfacing between the microprocessor 26 and boiler 12 is through a conventional programmable interface adaptor (PIA) 36.

Data processed by microprocessor 26 is stored in an RAM 32 in a conventional manner. Programming for the microprocessor is stored as firmware in a read-only memory (ROM) 38.

The operation of the hardware circuitry of FIG. 4 is controlled by programming to be described in detail below. Interfacing of the hardware components to implement a microprocessor controlled circuit, being well within ordinary skill in the art, shall accordingly not be described.

In accordance with the invention, and with reference now to FIG. 5, microprocessor 26 is controlled by the firmware stored in ROM 38 as follows. The microprocessor is maintained initially in a wait or quiescent state, during step 40, until a call signal is received by the boiler 12. The call signal is not acted upon by the boiler 12, but rather is transferred to microprocessor 26 via PIA 36.

Microprocessor 26 now executes a routine to calculate the call signal delay interval corresponding to the cross hatched regions of the improved boiler sequence shown in FIG. 2. Thus, in step 42 of the program, outside temperature measured by sensor 18 is read, converted to a digital signal by converter 30, and stored. The length of time elapsed since the end of the previous sequence is determined in step 44 and the delay is calculated (step 46). Following expiration of the calculated delay interval measured by real time clock 28, the call signal is returned (step 50) to the boiler 12 through PIA 36. In response, the boiler executes a sequence to bring the zone being heated to the preselected temperature. The time duration of the Fire interval of the sequence, determined by the size of the heat load and temperature differential involved, is measured and accumulated with previous like intervals, in step 52, the sequence count is incremented, in step 54, and the display 29 updated.

In step 46, the call signal delay as noted is calculated based upon ambient temperature and the time elapsed since the end of the previous cycle. More specifically, delay D is computed as follows:

$$D = (PCH)(T)(\%/\text{degree F.})$$

where:
PCH is "percentage off time" the length of time since the end of the previous boiler cycle;
T is outside temperature in degrees F.; and
(%/degrees F.) is a programmed parameter representing the percentage of holdoff time per degree Fahrenheit of outside temperature.

Figure 6:
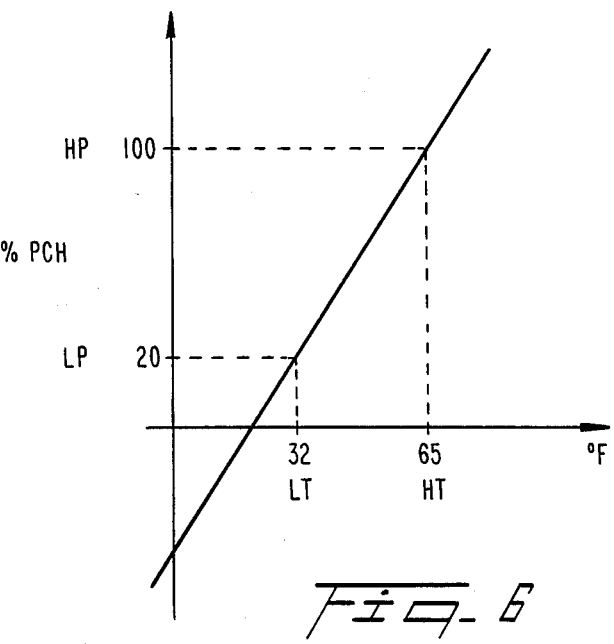
FIG. 6 is a graph of percent hold off as a function of ambient temperature.

The PCH is an empirically measured parameter of the system, determined during execution of successive boiler sequences by timer 20. The PCH is multiplied by a product of the outside temperature and the (%/degree F.) parameter, which is a linear function of the percentage holdoff with respect to the outside ambient temperature and is a parameterization of the boiler system under control, as shown in FIG. 6. The (%/degree F.) parameter is programmed into controller 16, the particular value thereof being related to the size and type of heating load boiler and related equipment, climate, etc., and can be selected in accordance with particular load and control requirements.

Having described the invention, the embodiments in which an exclusive property or privilege is claimed are defined as follows.

What is claimed is:

1. In a boiler controlled to operate in a boiler sequence characterized by pre-purge, ignition, firing and post purge sequence steps, the sequence being initiated by a call signal representative of a demand for heating, an improved control for reducing the number of boiler sequences executed by the boiler over time, comprising:

first means for measuring ambient temperature and generating a first output corresponding thereto;

second means for determining a time elapsed since the end of the previous boiler sequence and generating a second output corresponding thereto; and third means, responsive to said first and second outputs of said first and second means respectively, for controllably delaying said call signal.

2. The improved boiler control of claim 1, wherein: said means for controllably delaying a portion of the next boiler sequence comprises means for delaying an ignition portion of said next boiler sequence.

3. The improved boiler control of claim 1, wherein: said means for measuring the ambient temperature and elapsed time comprises means for generating a corresponding digital output signal.

4. The improved boiler control of claim 1, wherein: said means for measuring the ambient temperature and elapsed time comprises a real time clock and means for generating a digital output signal responsive to real time determined thereby.

5. The improved boiler control of claim 1, wherein: said third means comprises fourth means for delaying said ignition step in the next one of said boiler sequences.

6. The improved boiler control of claim 1, wherein: said fourth means comprises means for storing data corresponding to at least one of said first, second and third outputs.

7. The improved boiler control of claim 6, further comprising:

microprocessor means for processing said data.

8. In a boiler controlled to execute a boiler sequence comprising successive pre-purge, ignition, firing and post purge steps initiated by a call signal in response to a demand for heating, a method of reducing the number of boiler sequences executed by the boiler over time, comprising the steps of:

measuring ambient temperature to obtain a first signal;

determining a time elapsed since the end of the previous boiler sequence to obtain a second signal;

combining the first and second signals to obtain a third signal; and controllably delaying the call signal in accordance with the third signal.

9. The method of claim 8, including the steps of accumulating an aggregate firing time during a predetermined time interval and displaying said aggregate firing time.

10. The method of claim 8, including the step of counting the number of boiler sequences executed by said boiler during a predetermined time interval and displaying said number.

11. The method of claim 8, further comprising the step of:

storing data representative of at least one of said first, second and third signals.

12. The method of claim 8, wherein:

the step of controllably delaying said call signal comprises the step of computing a time delay according to a relationship $$D = (PCH).(T).(\%/°F.)$$

where D is said time delay, PCH is "percentage off time", the measured length of hold off time since the end of the previous boiler cycle, T is the outside ambient temperature in °F., and (%/°F.) is a programmed parameter representing the percentage of hold off time per degree Fahrenheit of the outside ambient temperature that is determined empirically during execution of boiler sequences and is related to the size and type of load on the boiler.

13. In a boiler controlled to execute a boiler sequence initiated by a call signal in response to a demand for heating, a method of reducing the number of boiler sequences executed by the boiler over time, comprising the steps of:

measuring an ambient temperature;

determining a time elapsed since the end of the previous boiler sequence; and controllably delaying the initation of the current boiler sequence in accordance with the measured ambient temperature and time elapsed, wherein:

the step of controllably delaying initiation of the next one of said boiler sequences comprises the step of computing a time delay according to a relationship $$D = (PCH).(T).(\%/°F.)$$

where D is said time delay, PCH is "percentage off time", the measured length of hold off time since the end of the previous boiler cycle, T is outside ambient temperature in °F., and (%/°F.) is a programmed parameter representing the percentage of hold off time per degree Fahrenheit of the outside ambient temperature that is determined empirically during the execution of boiler sequences and is related to the size and type of load on the boiler.

* * * * *

UNITED STATES PATENT AND TRADEMARK OFFICE
CERTIFICATE OF CORRECTION

PATENT NO. : 4,850,310

DATED : July 25, 1989

INVENTOR(S) : Harry WILDGEN

It is certified that error appears in the above-identified patent and that said Letters Patent is hereby corrected as shown below:

Column 3, line 26, Change "hereinfater" to --hereinafter--

Column 3, line 55, Change "126" to --16--

Signed and Sealed this

Eighth Day of January, 1991

Attest:

HARRY F. MANBECK, JR.

*Attesting Officer*  *Commissioner of Patents and Trademarks*

UNITED STATES PATENT AND TRADEMARK OFFICE
CERTIFICATE OF CORRECTION

PATENT NO. : 4,850,310
DATED : July 25, 1989
INVENTOR(S) : Harry WILDGEN

It is certified that error appears in the above-identified patent and that said Letters Patent is hereby corrected as shown below:

At column 3:

line 44, change "controller" to --counter--;

line 62, change "analogdigital" to --analog-to-digital--;

line 67, change "an" to --a--;

line 68, change "RAM" to --random access memory (RAM)--.

Signed and Sealed this

Twelfth Day of May, 1992

*Attest:*

DOUGLAS B. COMER

*Attesting Officer*      *Acting Commissioner of Patents and Trademarks*